US012620824B2

(12) United States Patent
Tanaka et al.

(10) Patent No.: US 12,620,824 B2
(45) Date of Patent: May 5, 2026

(54) COMMUNICATION ADAPTER

(71) Applicant: DAIKIN INDUSTRIES, LTD., Osaka (JP)

(72) Inventors: Toshiyuki Tanaka, Osaka (JP); Noriyuki Shinohara, Osaka (JP); Minoru Chihara, Osaka (JP); Yoshimasa Nakayama, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/574,447

(22) PCT Filed: Jun. 23, 2022

(86) PCT No.: PCT/JP2022/025126
§ 371 (c)(1),
(2) Date: Dec. 27, 2023

(87) PCT Pub. No.: WO2023/282081
PCT Pub. Date: Jan. 12, 2023

(65) Prior Publication Data
US 2024/0297520 A1    Sep. 5, 2024

(30) Foreign Application Priority Data

Jul. 9, 2021    (JP) ................................. 2021-114547

(51) Int. Cl.
*H02J 7/00*        (2026.01)
*H02J 13/13*       (2026.01)
(52) U.S. Cl.
CPC .......... *H02J 7/865* (2026.01); *H02J 13/1331* (2026.01)
(58) Field of Classification Search
CPC .... H02J 7/0068; H02J 13/00022; H02J 9/068; H02J 9/005; H02J 2207/10; H02J 9/061; H02J 2207/50; F24F 11/88
See application file for complete search history.

(56) References Cited

U.S. PATENT DOCUMENTS

2006/0164040 A1*  7/2006  Ohkubo .................... G06F 1/30
                                                    320/135
2008/0046768 A1*  2/2008  Chuang .................... G06F 1/30
                                                    709/224
(Continued)

FOREIGN PATENT DOCUMENTS

CN        208174746 U    11/2018
CN        109194893       1/2019
(Continued)

OTHER PUBLICATIONS

International Search Report for PCT/JP2022/025126 mailed on Sep. 13, 2022.
(Continued)

*Primary Examiner* — Rexford N Barnie
*Assistant Examiner* — Thai H Tran
(74) *Attorney, Agent, or Firm* — IPUSA, PLLC

(57)        ABSTRACT

A communication adapter capable of performing communication even in a case where power supply from an external device has ceased is provided. The communication adapter includes a power storage configured to receive power supplied from an external device and store the power, a communication unit configured to receive power supplied from the power storage, a control unit configured to communicate with an external management device via the communication unit, a first power supply line through which the power supplied from the external device goes to the control unit, thereby bypassing the power storage, and a second power supply line through which the power supplied from the power storage goes to the control unit.

8 Claims, 4 Drawing Sheets

(56)        References Cited

U.S. PATENT DOCUMENTS

| | | | | |
|---|---|---|---|---|
| 2011/0242715 A1* | 10/2011 | Voisine | ................. | G01D 4/004 |
| | | | | 361/65 |
| 2013/0219931 A1* | 8/2013 | Childs | ..................... | F24F 11/83 |
| | | | | 62/126 |
| 2013/0293018 A1 | 11/2013 | Wu et al. | | |
| 2016/0248898 A1 | 8/2016 | Ito et al. | | |
| 2019/0199130 A1 | 6/2019 | Minezawa | | |
| 2022/0103006 A1* | 3/2022 | Inai | ........................ | H02J 1/082 |

FOREIGN PATENT DOCUMENTS

| | | |
|---|---|---|
| JP | 2002-171361 | 6/2002 |
| JP | 2005-151626 | 6/2005 |
| JP | 2005-223541 | 8/2005 |
| JP | 2013-115551 | 6/2013 |
| JP | 2014-185832 | 10/2014 |
| JP | 6147355 | 6/2017 |

OTHER PUBLICATIONS

Daikin Ind Ltd, "General catalog of gas heat pump air conditioner Sep. 2014", Internet<https://ec.daikinaircon.com/ecatalog/CP11338FXX/index.html>,in particular, "DIII-NET Expander Adaptor", 2014 [retrieval date Aug. 31, 2022], p. 133, with English concise explanation.

Extended European search report mailed on Nov. 13, 2024 with respect to the corresponding European patent application No. 22837498.9.

International Preliminary Report on Patentability for PCT/JP2022/025126 mailed on Jan. 18, 2024.

* cited by examiner

COMMUNICATION ADAPTER

TECHNICAL FIELD

The present disclosure relates to a communication adapter.

BACKGROUND ART

Hitherto, there has been a communication adapter configured to be connected to an electric device and to receive power supply from the electric device, wherein the communication adapter includes a power source terminal configured to receive power from the electric device, a current limiting circuit configured to limit a current when overloading occurs, a power storage configured to store charges, a booster circuit configured to boost the charges stored in the power storage, and a communication device, and is characterized by charging the power storage with a current supplied via the current limiting circuit from the power source terminal receiving power from the electric device, boosting the voltage across the power storage, and supplying power to the communication device. The communication adaptor also includes a microcomputer connected to the power source terminal (for example, see PTL 1).

CITATION LIST

Patent Literature

PTL 1: Japanese Patent Application Publication No. 2005-223541

SUMMARY OF INVENTION

Technical Problem

Here, in a case where the power supply from the electric device has ceased, existing communication adapters may not be capable of performing communication because they do not have a path through which the microcomputer is supplied with power in such a case.

Hence, it is an object to provide a communication adapter capable of performing communication even in a case where power supply from an external device has ceased.

Solution to Problem

In an embodiment of the present disclosure, a communication adapter including:

a power storage configured to receive power supplied from an external device and store the power;

a communication unit configured to receive power supplied from the power storage;

a control unit configured to communicate with an external management device via the communication unit;

a first power supply line through which the power supplied from the external device goes to the control unit, thereby bypassing the power storage; and a second power supply line through which the power supplied from the power storage goes to the control unit is provided.

According to this configuration, it is possible to provide a communication adapter capable of performing communication even when the power supply from the external device has ceased.

The communication adapter described above may further include a switch circuit configured to switch between the first power supply line and the second power supply line.

According to this configuration, it is possible to reliably switch between the first power supply line and the second power supply line in response to the power supply from the external device having ceased.

In the communication adapter described above, the control unit may switch between the first power supply line and the second power supply line by driving the switch circuit based on a voltage of the power supplied from the external device.

According to this configuration, it is possible to reliably switch between the first power supply line and the second power supply line in accordance with the voltage of the power supplied from the external device.

In the communication adapter described above, the control unit may switch from the first power supply line to the second power supply line in response to the voltage of the power supplied from the external device becoming lower than or equal to a predetermined value.

According to this configuration, power supply to the control unit through the second power supply line via the power storage can be performed in response to the voltage of the power supplied from the external device becoming lower than or equal to the predetermined value.

In the communication adapter described above, the control unit may switch to a power saving mode in response to the voltage of the power supplied from the external device becoming lower than or equal to the predetermined value.

According to this configuration, it is possible to save on power consumption by the control unit in response to the voltage of the power supplied from the external device becoming lower than or equal to the predetermined value.

In the communication adapter described above, the control unit may receive power supplied through the first power supply line while the power is being supplied from the external device, and receive power supplied through the second power supply line while supply of power from the external device is interrupted.

According to this configuration, power can be supplied to the control unit through the second power supply line via the power storage while the power supply from the external device is interrupted.

The communication adapter described above may further include a booster configured to output an output voltage of the power storage to the communication unit by boosting the output voltage. According to this configuration, the communication unit can perform communication even in a case of the output voltage of the power storage being low.

The communication adapter described above may further include a current limiter situated at an upstream side of the power storage, wherein the power supplied to the control unit through the first power supply line may be from an upstream side of the current limiter.

According to this configuration, it is possible to supply a sufficient power to the control unit through the first power supply line without being limited by the current limiter.

In the communication adapter described above, the external device may be an outdoor unit of an air conditioner.

According to this configuration, it is possible to provide a communication adapter capable of performing communication even in a case of the power supply from the outdoor unit of the air conditioner having ceased.

In another embodiment of the present disclosure, a communication adapter including:

a power storage configured to receive power supply from an external device and store power;

a communication unit configured to receive power supply from the power storage; and a control unit capable of communicating with an external management device via the communication unit is provided.

A capacity of the power storage for the control unit to communicate with the external management device has a lower limit that is variable, and the lower limit of the capacity of the power storage while the power storage is receiving the power supply from the external device is a first capacity value, whereas the lower limit of the capacity of the power storage in a case of the power supply to the power storage from the external device being interrupted is a second capacity value lower than the first capacity value.

According to this configuration, it is possible to provide a communication adapter that can notify occurrence of power supply interruption to the external management device in response to the power supply interruption.

In the communication adapter described above, the control unit may switch to a power saving mode in response to the power supply from the external device being interrupted.

According to this configuration, it is possible to save on power consumption by the control unit in a case of power supply interruption.

In the communication adapter described above, the control unit may switch to the power saving mode by notifying occurrence of interruption of the power supply from the external device to the external management device via the communication unit.

According to this configuration, it is possible to satisfy both of notifying occurrence of interruption of the power supply to the external management device, and saving power to be consumed by the control unit.

In the communication adapter described above, the control unit may sense interruption of the power supply in response to a voltage of power supplied to the power storage from the external device becoming lower than or equal to a predetermined value.

According to this configuration, it is possible to easily sense occurrence of interruption of the power supply based on reduction in the voltage of the supplied power.

In the communication adapter described above, the control unit may remain capable of notifying occurrence of the interruption of the power supply to the external management device via the communication unit from the time interruption of the power supply is sensed until the capacity of the power storage decreases to the second capacity value.

According to this configuration, it remains possible to notify occurrence of interruption of the power supply until decrease to the second capacity value lower than the first capacity value, which is the lower limit while the power storage is receiving the power supply from the external device. Hence, it is possible to more reliably notify occurrence of interruption of the power supply to the external management device.

In the communication adapter described above, the control unit may stop communication of the communication unit in response to the capacity of the power storage decreasing below the second capacity value after interruption of the power supply is sensed.

According to this configuration, it is possible to reliably notify occurrence of interruption of the power supply to the external management device by remaining capable of notifying until the capacity of the power storage decreases to the second capacity value, and to also stop communication of the communication unit in response to the capacity decreasing below the second capacity value.

In the communication adapter described above, a difference between the first capacity value and the second capacity value may be a capacity value for the control unit to be capable of notifying occurrence of interruption of the power supply to the external management device repeatedly a predetermined number of times.

According to this configuration, the control unit can notify occurrence of interruption of the power supply to the external management device repeatedly a predetermined number of times after the capacity of the power storage decreases below the first capacity value, and can more reliably notify occurrence of interruption of the power supply to the external management device in response to interruption of the power supply.

In the communication adapter described above, a difference between a maximum capacity value and the first capacity value of the power storage may be greater than a difference between the first capacity value and the second capacity value.

According to this configuration, a sufficient available capacity to communicate with the external management device can be secured in the power storage in a normal state, in which the communication unit needs more power than in a case of power supply interruption because of sending data regarding the external device to the external management device.

In the communication adapter described above, the first capacity value and the second capacity value may be voltage values of the power storage.

According to this configuration, it is possible to manage the lower limit easily based on the voltage values of the power storage.

In the communication adapter described above, the external device may be an outdoor unit of an air conditioner.

According to this configuration, it is possible to notify occurrence of interruption of the power supply to the external management device in response to interruption of the power supply from the outdoor unit of the air conditioner.

DESCRIPTION OF EMBODIMENTS

An embodiment to which a communication adapter according to the present disclosure is applied will be described below.

Embodiment

Figure 1:
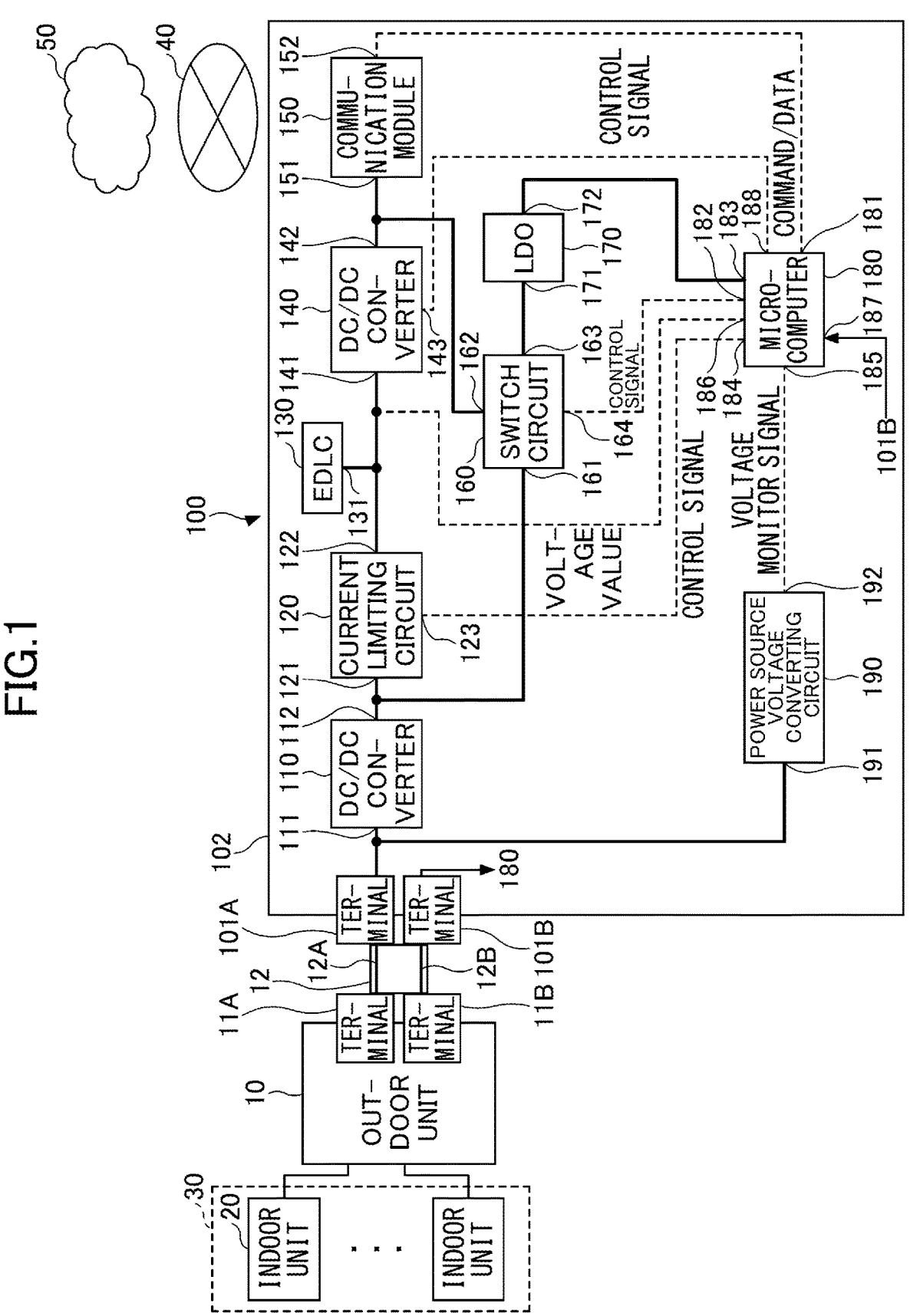
FIG. 1 is a drawing illustrating an example of a configuration of a communication adapter 100.

FIG. 1 is a drawing illustrating an example of the configuration of a communication adapter 100. FIG. 1 illustrates an outdoor unit 10, indoor units 20, a building 30, a network 40, and a cloud server 50 in addition to the communication adapter 100.

<Outdoor Unit 10, Indoor Unit 20, and Building 30>

The outdoor unit 10 is an example of the external device, and is an outdoor unit of an air conditioner. The outdoor unit 10 includes a terminal 11A for power supply, and a terminal 11B for data output. The terminals 11A and 11B are connectors. The terminal 11A is connected to a terminal 101A of the communication adapter 100 through a power source line 12A of a cable 12, such that the outdoor unit 10 supplies power to the communication adapter 100. The cable 12 is one cable including the power source line 12A for power supply and a communication line 12B for data communication. For example, the power source line 12A and the communication line 12B each actually include two lines. The terminal 11B is connected to a terminal 101B of the communication adapter 100 through the communication line 12B of the cable 12, and is also connected to a control unit of the outdoor unit 10 and to control units of the plurality of indoor units 20 through a data cable, such that the outdoor unit 10 outputs operating state data indicating operating states of the outdoor unit 10 and the plurality of indoor units 20 to the communication adapter 100. For example, the terminals 101A and 100B are two terminals included in one connector. The one cable 12 including the power source line 12A and the communication line 12B may be replaced with a configuration in which a cable for the power source line 12A and a cable for the communication line 12B are separate cables.

The outdoor unit 10 is situated outside the building 30, and is connected to the plurality of indoor units 20 situated inside the building 30 through refrigerant piping and the data cable. Here, the configuration in which the plurality of indoor units 20 are connected to the one outdoor unit 10 is described. However, one indoor unit 20 may be connected to the one outdoor unit 10. For example, each indoor unit 20 has a cooling/heating function, and an air ventilating function.

<Cloud Server 50>

The cloud server 50 is an example of the external management device, and can perform data communication with a communication module 150 of the communication adapter 100 through the network 40 such as the Internet. The cloud server 50 is realized by one or a plurality of computer systems, and, for example, is configured to receive the operating state data indicating the operating states of the outdoor unit 10 and the plurality of indoor units 20 from the communication adapter 100. The cloud server 50 is also configured to receive an operation signal for remotely operating any indoor unit 20 from a terminal device such as a smartphone of the user of any indoor unit 20 and send it to the communication adapter 100 through the network 40. As a result, the communication adapter 100 transmits the received operation signal to the outdoor unit 10, and the outdoor unit 10 and the indoor unit 20 are driven in accordance with the operation signal. The cloud server 50 does not need to support remote operations of the indoor units 20 from terminal devices such as smartphones.

<Configuration of Communication Adapter 100>

The communication adapter 100 includes the terminal 101A, the terminal 101B, a housing 102, a Direct Current (DC)/DC converter 110, a current limiting circuit 120, and an Electrical Double Layer Capacitor (EDLC) 130. The communication adapter 100 also includes a DC/DC converter 140, the communication module 150, a switch circuit 160, a Low Drop Out (LDO) 170, a microcomputer 180, and a power source voltage converting circuit 190.

Among these, the current limiting circuit 120 is an example of the current limiter. The EDLC 130 is an example of the power storage. The DC/DC converter 140 is an example of the booster. The communication module 150 is an example of the communication unit. The microcomputer 180 is an example of the control unit.

<Overview of Operation of Communication Adapter 100>

The communication module 150 of the communication adapter 100 is configured to send operating state data of the outdoor unit 10 and the plurality of indoor units 20 to the cloud server 50 regularly or irregularly. Hence, the cloud server 50 can keep track of the operating states of the outdoor unit 10 and the plurality of indoor units 20.

In case of a cease of data sending from the communication adapter 100, the cloud server 50 cannot recognize whether data sending has ceased due to power supply interruption due to, for example, maintenance or a blackout, or due to, for example, communication trouble. Hence, when interruption of the power supply from the outdoor unit 10 occurs, the communication adapter 100 sends interruption occurrence data indicating that interruption of the power supply has occurred to the cloud server 50 through the network 40.

<Terminal 101A>

The terminal 101A is a terminal configured to receive power supply from the outdoor unit 10, and is connected to the terminal 11A of the outdoor unit 10 through the power source line 12A of the cable 12 outside the communication adapter 100. The terminal 101A is, for example, a connector that can be connected to the terminal 11A that is also realized by a connector. The power supplied from the outdoor unit 10 is a direct-current power, and, for example, the voltage value and the current value of the power are set to predetermined values. The terminal 101A may receive power supply from an external device other than the outdoor unit 10. In this case, operating state data indicating the operating states of the outdoor unit 10 and the indoor units 20 may be input into the terminal 101B from the external device other than the outdoor unit 10. The communication adapter 100 may send interruption occurrence data to the cloud server 50 through the network 40 when interruption of the power supply from the external device other than the outdoor unit 10 occurs.

Inside the communication adapter 100, the terminal 101A is connected to an input terminal 111 of the DC/DC converter 110 and to an input terminal 191 of the power source voltage converting circuit 190. The power supplied to the terminal 101A from the outdoor unit 10 is output to the DC/DC converter 110 and to the power source voltage converting circuit 190.

The terminal 101A is a terminal for the communication adapter 100 to be able to receive power supply from outside. When the power supply from the outdoor unit 10 is interrupted, the communication adapter 100 enters a state of the external power supply being interrupted. The power supply from the outdoor unit 10 is interrupted when, for example, the power source of the whole building 30 is interrupted for maintenance of the building 30, or when power supply to the building 30 ceases due to, for example, a blackout.

<Terminal 101B>

The terminal 101B is a data input terminal through which operating state data indicating the operating states of the outdoor unit 10 and the plurality of indoor units 20 is input from the outdoor unit 10, and is connected to the terminal 11B of the outdoor unit 10 through the communication line 12B of the cable 12 outside the communication adapter 100. The terminal 101B is, for example, a connector that can be connected to the terminal 11B that is also realized by a connector. Inside the communication adapter 100, the terminal 101B is connected to a terminal 187 of the microcomputer 180, and transmits the operating state data to the microcomputer 180.

<Housing 102>

The housing 102 is, for example, a resin case in which the DC/DC converter 110, the current limiting circuit 120, the EDLC 130, the DC/DC converter 140, the communication module 150, the switch circuit 160, the LDO 170, the microcomputer 180, and the power source voltage converting circuit 190 are contained. The housing 102 is configured for the communication module 150 to be able to communicate with the cloud server 50 through the network 40, and also holds the terminal 101A in an externally exposed state. For example, it is easy to set up the communication adapter 100, by only connecting the terminal 101A to the terminal 11A of the outdoor unit 10 through the power source line 12A of the cable 12 and fixing the housing 102 on the outdoor unit 10.

<DC/DC Converter 110>

The DC/DC converter 110 includes the input terminal 111 and an output terminal 112. The DC/DC converter 110 is situated between the terminal 101A, and the current limiting circuit 120 and the switch circuit 160. More specifically, the input terminal 111 is connected to the terminal 101A, and an input terminal 121 of the current limiting circuit 120 and an input terminal 161 of the switch circuit 160 are connected to the output terminal 112. The DC/DC converter 110 is configured to output the power supplied from the outdoor unit 10 through the terminal 101A to the current limiting circuit 120 and to the switch circuit 160 by boosting the voltage value of the power.

<Current Limiting Circuit 120>

The current limiting circuit 120 includes the input terminal 121, an output terminal 122, and a control terminal 123. The current limiting circuit 120 is situated between the DC/DC converter 110 and the EDLC 130. More specifically, the input terminal 121 of the current limiting circuit 120 is connected to the output terminal 112 of the DC/DC converter 110, and the output terminal 122 of the current limiting circuit 120 is connected to an input/output terminal 131 of the EDLC 130 and to an input terminal 141 of the DC/DC converter 140. The control terminal 123 is connected to a control terminal 184 of the microcomputer 180. The current limiting circuit 120 is a circuit configured to output a direct-current power supplied from the DC/DC converter 110 to the EDLC 130 by limiting the current value of the direct-current power to lower than or equal to a predetermined value. The predetermined value, which is the upper limit to or below which the current limiting circuit 120 limits the current value, is set in accordance with a control signal that is input into the control terminal 184 from the microcomputer 180. For example, the predetermined value is either a first predetermined value or a second predetermined value lower than the first predetermined value. The first predetermined value and the second predetermined value are both fixed values. The predetermined value is set to either the first predetermined value or the second predetermined value in accordance with the control signal input from the microcomputer 180.

<EDLC 130>

The EDLC 130 includes the input/output terminal 131. The EDLC 130 includes the input/output terminal 131 that is connected to a power transmission path between the current limiting circuit 120 and the DC/DC converter 140. The input/output terminal 131 is connected to the output terminal 122 of the current limiting circuit 120 and the input terminal 141 of the DC/DC converter 140. The input/output terminal 131 is also connected to a terminal 186 of the microcomputer 180. The EDLC 130 is configured to store the direct-current power supplied from the current limiting circuit 120. The output voltage of the EDLC 130 is proportional to the amount of charges stored in the EDLC 130. The output voltage of the EDLC 130 is also input into the terminal 186 of the microcomputer 180 for being monitored, and is monitored by the microcomputer 180.

The EDLC 130 is provided in order to store power that is used for the communication module 150 to send a notification to the cloud server 50 when the power supplied from the outdoor unit 10 to the communication adapter 100 is interrupted. However, because the EDLC 130 is situated at the output side of the current limiting circuit 120 and supplied with a current in a limited amount, it cannot store as much power as can be infinitely used by the communication module 150 and the microcomputer 180 in response to occurrence of power supply interruption. Hence, the communication adapter 100 puts limitations on the operations of the communication module 150 and the microcomputer 180 when power supply interruption occurs. The limitations will be described below.

<DC/DC Converter 140>

The DC/DC converter 140 includes the input terminal 141, an output terminal 142, and a terminal 143. The DC/DC converter 140 is connected to the current limiting circuit 120, the EDLC 130, the communication module 150, and the switch circuit 160. More specifically, the input terminal 141 is connected to the output terminal 122 of the current limiting circuit 120 and to the input/output terminal 131 of the EDLC 130, and the output terminal 142 is connected to a power input terminal 151 of the communication module 150 and to an input terminal 162 of the switch circuit 160.

The DC/DC converter 140 is provided to boost the output voltage of the EDLC 130 to a voltage necessary for the operation of the communication module 150. The DC/DC converter 140 is controlled by a control signal input into the terminal 143 from a terminal 188 of the microcomputer 180. That is, the DC/DC converter 140 is controlled by the microcomputer 180.

<Communication Module 150>

The communication module 150 is situated at the output side of the DC/DC converter 140. The communication module 150 includes the power input terminal 151 and a communication terminal 152. The power input terminal 151 is connected to the output terminal 142 of the DC/DC converter 140, and a direct-current power necessary for the communication module 150 to operate is input into the power input terminal 151. The communication terminal 152 is an interface (I/F) for communication, and is connected to a communication terminal 181 of the microcomputer 180 and configured to receive data from and output data to the microcomputer 180. Operating state data is input into the communication terminal 152 from the communication terminal 181 of the microcomputer 180.

For example, the communication module 150 communicates with the cloud server 50 through the network 40 in accordance with Long Term Evolution (LTE). The communication module 150 sends operating state data of the outdoor unit 10 and the plurality of indoor units 20 to the cloud server 50 through the network 40 regularly or irregularly in a normal state in which no interruption of power supply is occurring. The communication module 150 sends interruption occurrence data indicating that power supply interruption has occurred to the cloud server 50 through the network 40 when the power supply interruption occurs. The interruption occurrence data is input into the communication terminal 152 from the communication terminal 181 of the microcomputer 180.

<Switch Circuit 160>

The switch circuit 160 is situated between the DC/DC converter 110 and the LDO 170, and is also situated between the DC/DC converter 140 and the LDO 170. The switch circuit 160 is a three-terminal switch including the input terminal 161, the input terminal 162, an output terminal 163, and a control terminal 164. For example, the switch circuit 160 is formed by two LDOs each having a reverse current flow inhibiting function. The input terminal 161 is connected to the output terminal 112 of the DC/DC converter 110, and the input terminal 162 is connected to the output terminal 142 of the DC/DC converter 140. The output terminal 163 is connected to an input terminal 171 of the LDO 170, and the control terminal 164 is connected to a control terminal 182 of the microcomputer 180.

The switch circuit 160 is configured to perform switching to connect the output terminal 163 to either the input terminal 161 or the input terminal 162 based on a control signal input into the control terminal 164 from the microcomputer 180. Hence, the switch circuit 160 is configured to output either the output voltage of the DC/DC converter 110 or the output voltage of the DC/DC converter 140 to the LDO 170. There may be a timing at which the two LDOs of the switch circuit 160 are both turned on, and there may be a timing at which the output voltage of the DC/DC converter 110 and the output voltage of the DC/DC converter 140 are both output to the LDO 170.

<LDO 170>

The LDO 170 is situated between the switch circuit 160 and the microcomputer 180. The LDO 170 includes the input terminal 171 and an output terminal 172. The input terminal 171 is connected to the output terminal 163 of the switch circuit 160, and the output terminal 172 is connected to a power source terminal 183 of the microcomputer 180. The LDO 170 is configured to output a direct-current power, which is supplied under either the output voltage of the DC/DC converter 140 or, by reducing the voltage value of the direct-current power to a power source voltage for the microcomputer 180.

<Microcomputer 180>

The microcomputer 180 is a control unit configured to control the entirety of the communication adapter 100. The microcomputer 180 is realized by a computer including, for example, a Central Processing Unit (CPU), a Random Access Memory (RAM), a Read Only Memory (ROM), an input/output interface, and an internal bus.

The microcomputer 180 includes the communication terminal 181, the control terminal 182, the power source terminal 183, the control terminal 184, a signal input terminal 185, the terminal 186, the terminal 187, and the terminal 188. The communication terminal 181 is connected to the communication terminal 152 of the communication module 150. The control terminal 182 is connected to the control terminal 164 of the switch circuit 160. The power source terminal 183 is connected to the output terminal 172 of the LDO 170. The control terminal 184 connected to the control terminal 123 of the current limiting circuit 120. The signal input terminal 185 is connected to an output terminal 192 of the power source voltage converting circuit 190. The terminal 186 is connected to the input/output terminal 131 of the EDLC 130. The terminal 187 is connected to the terminal 101B, and operating state data is input into the terminal 187 from the terminal 101B at regular time intervals. The terminal 188 is connected to the terminal 143 of the DC/DC converter 140, and outputs a control signal to the DC/DC converter 140.

The microcomputer 180 determines whether power is being supplied from the outdoor unit 10 or not based on a voltage monitor signal that is input from the output terminal 192 of the power source voltage converting circuit 190. The signal level of the voltage monitor signal changes in accordance with the voltage value of the direct-current power at the terminal 101A. The voltage monitor signal is at a High (H) level when the voltage value of the direct-current power at the terminal 101A is higher than a predetermined value, and is at a L level when the voltage value of the direct-current power at the terminal 101A is lower than or equal to the predetermined value. The microcomputer 180 senses that interruption of the power supply has occurred, in response to the voltage monitor signal becoming the L level. For example, the microcomputer 180 is not constantly monitoring the voltage monitor signal. Instead, in response to the voltage monitor signal input into the signal input terminal 185, which serves as an interrupt port, becoming the L level, the microcomputer 180 performs, as the top priority, outputting a control signal for switching the switch circuit 160 in response to the interruption of the power supply.

<Normal Mode and Power Saving Mode of Microcomputer 180>

The microcomputer 180 operates in a normal mode in the normal state in which interruption of the power supply is not occurring, and controls the communication module 150 to send operating state data of the outdoor unit 10 and the plurality of indoor units 20 to the cloud server 50 through the network 40 regularly or irregularly. The microcomputer 180 receives operating state data at regular time intervals, and stores the received operating state data for a certain period of time. Then, the microcomputer 180 compresses the stored operating state data and transmits the compressed operate state data to the communication module 150.

The normal mode is an operation mode in which the operation of the microcomputer 180 is not limited and the microcomputer 180 can control the communication module 150 to send the operating state data to the cloud server 50 regularly or irregularly.

In response to a power supply interruption being sensed, the microcomputer 180 switches to a power saving mode, and controls the communication module 150 to send interruption occurrence data indicating that power supply interruption has occurred to the cloud server 50. In this way, the microcomputer 180 notifies the interruption occurrence data to the cloud server 50 in response to the power supply interruption. When controlling the communication module 150 to send data, the microcomputer 180 sends a command and the data to the communication module 150 through the communication terminal 181.

The power saving mode is a mode in which the operation of the microcomputer 180 is limited to save on power consumption, and is an operation mode in which the microcomputer 180 can control the communication module 150 to send interruption occurrence data to the cloud server 50. The limitation on the operation of the microcomputer 180 in the power saving mode is, for example, reduction in the clock frequency, or stop of functions other than functions involved in communication.

<Selection of First Power Supply Line and Second Power Supply Line>

In the normal state, the microcomputer 180 outputs a control signal to the control terminal 164 through the control terminal 182 such that the input terminal 161 and the output terminal 163 of the switch circuit 160 are connected to each other. In this case, the power supplied from the outdoor unit 10 is supplied to the power source terminal 183 of the microcomputer 180 through the terminal 101A, the DC/DC converter 110, the input terminal 161 and the output terminal 163 of the switch circuit 160, and the LDO 170. The power supply line that leads to the power source terminal 183 from the terminal 101A through the DC/DC converter 110, the input terminal 161 and the output terminal 163 of the switch circuit 160, and the LDO 170 is an example of the first power supply line. The first power supply line is a power supply line through which power is supplied to the microcomputer 180 by bypassing the EDLC 130.

Moreover, in response to a power supply interruption being sensed, before switching to the power saving mode, the microcomputer 180 outputs a control signal to the control terminal 164 through the control terminal 182 such that the input terminal 162 and the output terminal 163 of the switch circuit 160 are connected to each other. In this case, the power stored in the EDLC 130 is supplied to the power source terminal 183 of the microcomputer 180 through the DC/DC converter 140, the input terminal 162 and the output terminal 163 of the switch circuit 160, and the LDO 170. The power supply line that leads to the power source terminal 183 from the EDLC 130 through the DC/DC converter 140, the input terminal 162 and the output terminal 163 of the switch circuit 160, and the LDO 170 is an example of the second power supply line. The second power supply line is a power supply line through which the microcomputer 180 is supplied with power from the EDLC 130 in a case of a power supply interruption.

The reason why the microcomputer 180 switches the switch circuit 160 such that it receives power supply through the first power supply line, thereby bypassing the EDLC 130 in the normal state, and selects the second power supply line through which it receives power supply from the EDLC 130 in response to occurrence of a power supply interruption is as follows.

In the normal state, the microcomputer 180 operates in the normal mode, and sends operating state data to the cloud server 50 via the communication module 150 regularly or irregularly.

On the other hand, in response to occurrence of a power supply interruption, the microcomputer 180 operates in the power saving mode, and sends interruption occurrence data to the cloud server 50 via the communication module 150.

The power to be consumed by the microcomputer 180 and the communication module 150 in response to occurrence of a power supply interruption is by far lower than the power consumed by the microcomputer 180 and the communication module 150 in the normal state.

Moreover, the power supplied to the terminal 101A from the outdoor unit 10 is supplied to the EDLC 130 in a state of the current value thereof being limited by the current limiting circuit 120. The power stored in the EDLC 130 is supplied to the communication module 150 both in the normal state and in a case of a power supply interruption.

Supplying power to the microcomputer 180 through the second power supply line means supplying power to both the microcomputer 180 and the communication module 150 from the EDLC 130. Hence, for example, supplying power to the microcomputer 180 from the EDLC 130 when booting the microcomputer 180 from the power saving mode to the normal mode may fail to supply a sufficient power to the microcomputer 180 and the communication module 150 that are to perform the normal-state operations. Moreover, an insufficient amount of power supply may cause a problem that the microcomputer 180 is booted slowly.

For the reason described above, in the normal state, the communication adapter 100 ensures quick booting of the microcomputer 180 and the correct normal-state operations, by supplying power to the microcomputer 180 through the first power supply line bypassing the EDLC 130.

On the other hand, in a case of a power supply interruption, the power supply from the outdoor unit 10 is interrupted and no power can be supplied to the microcomputer 180 through the first power supply line. Hence, the switch circuit 160 is switched such that power is supplied to the microcomputer 180 through the second power supply line. In a case of a power supply interruption, the microcomputer 180 is switched to the power saving mode, and data to be sent to the cloud server 50 via the communication module 150 is limited to interruption occurrence data. In a case of a power supply interruption, the communication module 150 does not send operating state data of the outdoor unit 10 and the plurality of indoor units 20 to the cloud server 50.

Hence, in a case of a power supply interruption, power consumed by the microcomputer 180 and the communication module 150 is saved to make it possible to notify the occurrence of the power supply interruption to the cloud server 50 by the power stored in the EDLC 130. For the reason described above, the switch circuit 160 is switched such that power is supplied to the microcomputer 180 through the first power supply line bypassing the EDLC 130 in the normal state and such that the second power supply line is selected to supply power to the microcomputer 180 from the EDLC 130 in a case of a power supply interruption.

<Setting of Lower Limit of Voltage Value of EDLC 130>

The microcomputer 180 monitors the output voltage value of the EDLC 130, and varies the lower limit of the voltage value of the EDLC 130 between the normal state and a case of a power supply interruption. The voltage value of the EDLC 130 represents the capacity (quantity) of charges stored in the EDLC 130. Hence, the lower limit of the voltage value of the EDLC 130 is an example of the lower limit of the capacity of the power storage.

Figure 2:
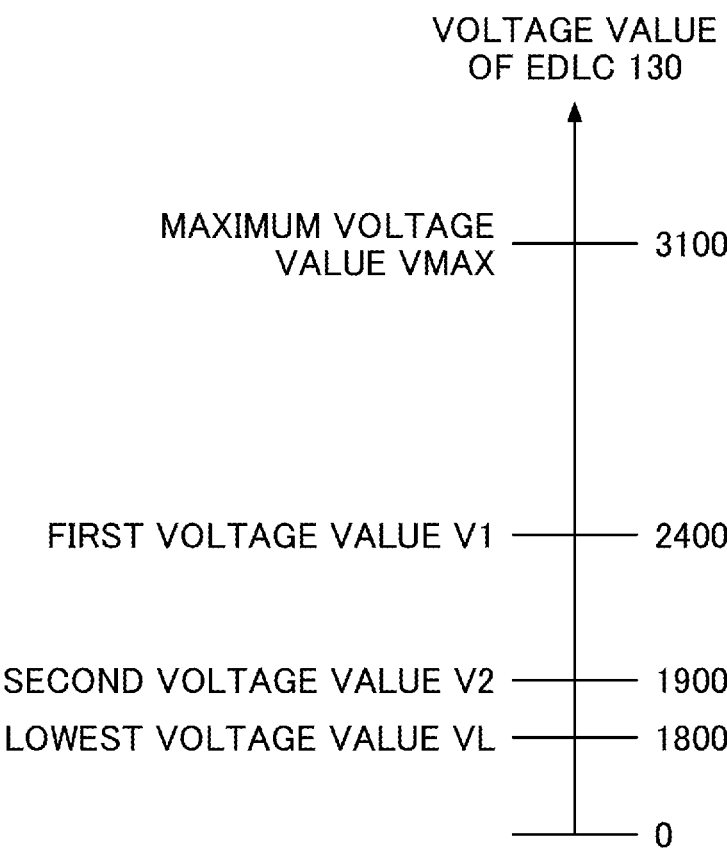
FIG. 2 is a drawing illustrating voltage values of an EDLC 130.

The following description will be provided with reference to FIG. 2 in addition to FIG. 1. FIG. 2 is a drawing illustrating the voltage values of the EDLC 130. FIG. 2 indicates the voltage values of the EDLC 130 as count values (no unit). For example, the voltage values of the EDLC 130 include a maximum voltage value VMAX having a count value of 3100, a first voltage value V1 of 2400, a second voltage value of 1900, and a lowest voltage value VL of 1800. Each voltage value will be described below.

The microcomputer 180 sets the lower limit of the voltage value of the EDLC 130 to the first voltage value V1 in the normal state in which the EDLC 130 is receiving power supply from the outdoor unit 10, and sets the lower limit of the voltage value of the EDLC 130 to the second voltage value V2 lower than the first voltage value V1 in response to the power supply to the EDLC 130 from the outdoor unit 10 being interrupted, before switching to the power saving mode. The first voltage value V1 is an example of the first capacity value, and the second voltage value V2 is an example of the second capacity value.

In response to a power supply interruption, the microcomputer 180 switches to the power saving mode, and prioritizes sending interruption occurrence data to the cloud server 50 by saving power to be consumed by itself. After sending this data, the microcomputer 180 shifts to a deep sleep mode in which it consumes an even lower power than in the power saving mode. The deep sleep mode is a state in which all clocks of the microcomputer 180 are stopped and the microcomputer 180 cannot start unless it receives a start command from outside. For example, when seeing that no problem will occur by not shifting to the deep sleep mode, the microcomputer 180 does not need to shift to the deep sleep mode. Moreover, when seeing that no problem will occur by not switching to the power saving mode in response to a power supply interruption, the microcomputer 180 does not need to switch to the power saving mode in response to the power supply interruption.

Hence, after sending a notification to the cloud server 50 in response to a power supply interruption, the microcomputer 180 and the communication module 150 shift to an operation stopping state. After shifting to the operation stopping state, the microcomputer 180 and the communication module 150 enter a state of not consuming the power in the EDLC 130.

In order to enable the communication module 150 to send interruption occurrence data to the cloud server 50 without fail, it is preferable to secure as much power as possible that can be used for the communication process of the communication module 150. Hence, the second voltage value V2, which is the lower limit of the voltage value of the EDLC 130 in a case of a power supply interruption, is set to be lower than the first voltage value V1, which is the lower limit in the normal state.

This is because after a notification is sent to the cloud server 50 in response to a power supply interruption, the microcomputer 180 and the communication module 150 enter a state of not consuming the power in the EDLC 130, and the operation to follow will not be affected even if the power in the EDLC 130 is consumed until the voltage value is down to the second voltage value V2 lower than the first voltage value V1, which is the lower limit in the normal state. The details being described below, the second voltage value V2 is a value obtained by adding a predetermined margin (allowance) to the lowest voltage value VL at which the communication adapter 100 can operate.

In the communication module 150 sending data to the cloud server 50, communication congestion may be occurring at the base station, or the communication module 150 may have poor reception. Hence, the communication module 150 may not always succeed in sending data to the cloud server 50 by one sending process. The details being described below, in a case of a power supply interruption, the microcomputer 180 remains capable of notifying the occurrence of the power supply interruption to the cloud server 50 via the communication module 150 until the voltage value of the EDLC 130 decreases to the second voltage value V2.

<Difference Between First Voltage Value V1 and Second Voltage Value V2>

The difference between the first voltage value V1 and the second voltage value V2 is a voltage value for the microcomputer 180 to be capable of notifying occurrence of a power supply interruption to the cloud server 50 repeatedly a predetermined number of times by using the communication module 150. The predetermined number of times is a number of times needed to repeatedly perform the sending process to ensure that the data can be sent to the cloud server 50 from the communication module 150 by overcoming, for example, occurrence of communication congestion at the base station or poor reception as described above. The predetermined number of times may be found and determined by, for example, experiments.

<Difference Between Maximum Voltage Value VMAX and First Voltage Value V1 of EDLC 130>

The difference between the maximum voltage value VMAX and the first voltage value V1 of the EDLC 130 is set to be greater than the difference between the first voltage value V1 and the second voltage value V2. The maximum voltage value VMAX is an example of the maximum capacity value, and may be determined based on, for example, the capacity of the EDLC 130. In the normal state, the power in the EDLC 130 is supplied to the communication module 150 yet is not supplied to the microcomputer 180. The microcomputer 180 is supplied with power from the DC/DC converter 110 that is at the upstream side of the current limiting circuit 120 through the first power supply line bypassing the EDLC 130. In the normal state, the communication module 150 needs more power than it does in a case of a power supply interruption, in order to send operating state data of the outdoor unit 10 and the plurality of indoor units 20 to the cloud server 50 regularly or irregularly. From this standpoint, the difference between the maximum voltage value VMAX and the first voltage value V1 of the EDLC 130 is set to be greater than the difference between the first voltage value V1 and the second voltage value V2.

<Stop of Communication of Communication Module 150>

In response to the voltage value of the EDLC 130 decreasing below the second voltage value V2 after a power supply interruption is sensed, the microcomputer 180 stops the communication of the communication module 150. Here, even if the communication module 150 is in the communicating state, the communication is stopped because the voltage value of the EDLC 130 decreasing below the second voltage value V2 means becoming close to the lowest voltage value at which the communication adapter 100 can operate.

<Power Source Voltage Converting Circuit 190>

The power source voltage converting circuit 190 includes the input terminal 191 and the output terminal 192. The input terminal 191 is connected to the terminal 101A, and the output terminal 192 is connected to the signal input terminal 185 of the microcomputer 180. The power source voltage converting circuit 190 is formed by, for example, a reset Integrated Circuit (IC), and is configured to monitor the voltage value of the direct-current power at the terminal 101A and output a voltage monitor signal having a signal level corresponding to the voltage value to the microcomputer 180. The power source voltage converting circuit 190 outputs a H-level voltage monitor signal when the voltage value of the direct-current power at the terminal 101A is higher than a predetermined value, and outputs a L-level voltage monitor signal when the voltage value of the direct-current power at the terminal 101A is lower than or equal to the predetermined value.

<Example of Operation of Communication Adapter 100>

Figure 3:
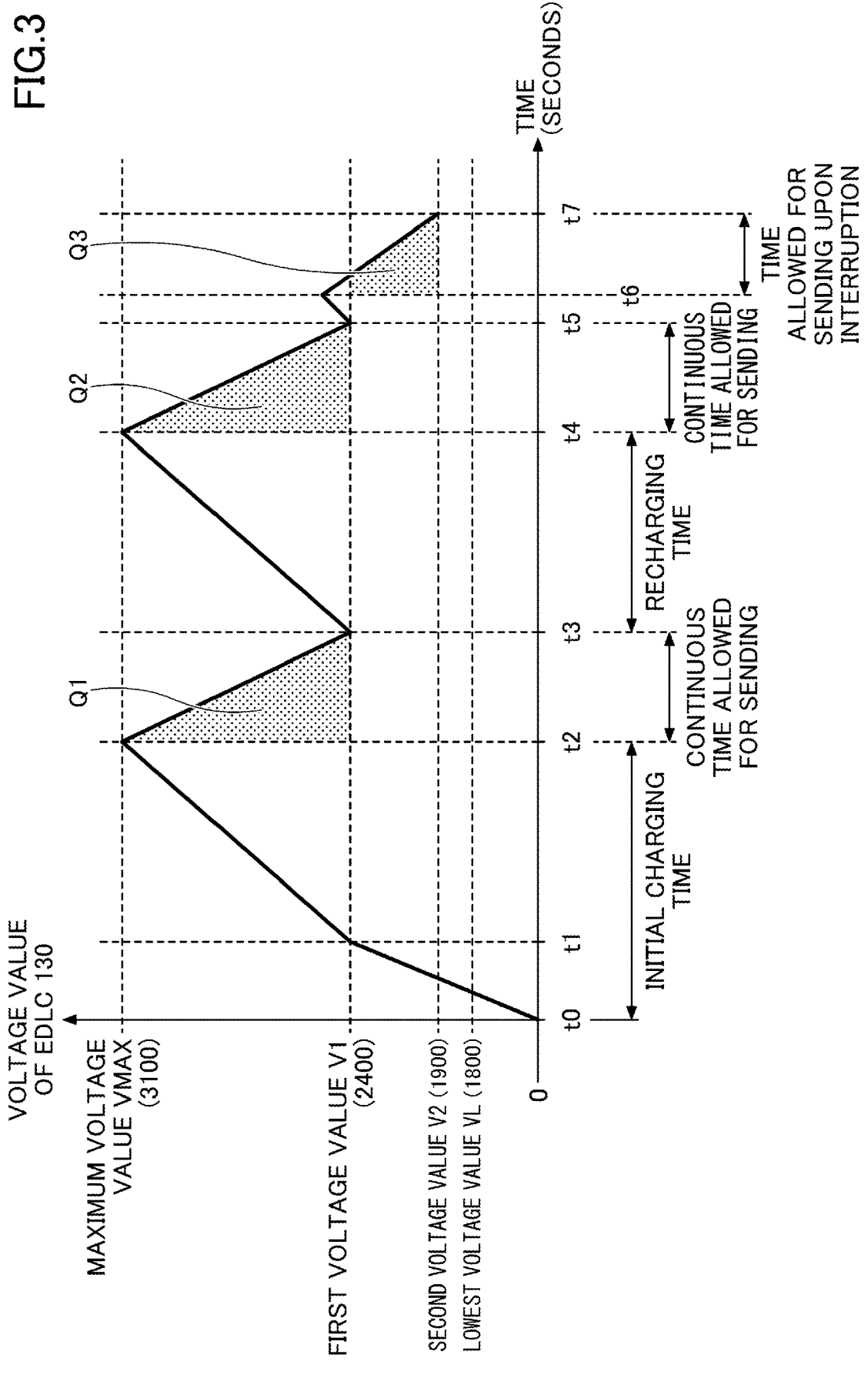
FIG. 3 is a drawing illustrating an example of an operation of the communication adapter 100.

FIG. 3 is a drawing illustrating an example of the operation of the communication adapter 100. In FIG. 3, the horizontal axis represents time (seconds), and the vertical axis represents the voltage value of the EDLC 130 by count value. The notation of the voltage value on the vertical axis is the same as in FIG. 2.

Initial charging starts at the timing to. At the timing to, the voltage value of the EDLC 130 is 0 (zero), and the communication adapter 100 is in the non-operating state. At the timing to, no power supply interruption is occurring.

Initial charging is started by the terminal 101A being connected to the terminal 11A of the outdoor unit 10 through the power source line 12A of the cable 12 and the power source of the outdoor unit 10 being turned on. By the EDLC 130 starting to be charged from the timing to, the voltage value of the EDLC 130 becomes higher than the lowest voltage value VL and the second voltage value V2 sequentially before the timing t1 is reached. Concurrently with the EDLC 130 starting to be charged, the power source of the communication adapter 100 is turned on and the microcomputer 180 is turned on. Concurrently with the voltage value of the EDLC 130 becoming higher than or equal to the lowest voltage value VL, the microcomputer 180 turns on the power source of the communication module 150. The power source of the communication adapter 100 may be turned on concurrently with the voltage value of the EDLC 130 reaching any voltage value between the first voltage value V1 and the maximum voltage value VMAX. This is for shortening the initial starting time.

In response to the voltage value of the EDLC 130 becoming higher than or equal to the first voltage value V1 at the timing t1, the communication module 150 is turned on and the EDLC 130 starts to supply power to the communication module 150. Hence, as of the timing t1, the slope (degree) of the increase in the voltage value of the EDLC 130 becomes gentler with respect to the elapse of time.

Here, the microcomputer 180 is supplied with power through the first power supply line bypassing the EDLC 130. More specifically, the microcomputer 180 is supplied with power from the DC/DC converter 110 through the switch circuit 160. The microcomputer 180 is turned on in response to the voltage value of the supplied power reaching a voltage value for operation. The timing at which the microcomputer 180 is turned on is, for example, before or after the timing to. Because the microcomputer 180 uses no power in the EDLC 130, almost no change occurs in the waveform illustrated in FIG. 3.

In response to the voltage value of the EDLC 130 reaching the maximum voltage value VMAX at the timing t2, the initial charging is completed. Hence, "INITIAL CHARGING TIME" is indicated at the timings from to through t2. Any time during the voltage value of the EDLC 130 being the maximum voltage value VMAX, the microcomputer 180 controls the communication module 150 to send operating state data of the outdoor unit 10 and the plurality of indoor units 20 to the cloud server 50. Here, for example, it is assumed that the microcomputer 180 controls the communication module 150 to send operating state data to the cloud server 50 at the timing t2 at which the initial charging is completed.

By the communication module 150 starting to send operating state data to the cloud server 50 at the timing t2, the voltage value of the EDLC 130 starts to decrease as of the timing t2. Here, for example, in order to describe the severest situation for the communication adapter 100, it is assumed that the communication module 150 performs the sending process to send operating state data to the cloud server 50 repeatedly. Hence, the voltage value of the EDLC 130 decreases continuously from the timing t2.

In response to the voltage value of the EDLC 130 decreasing to the first voltage value V1 at the timing t3, the microcomputer 180 stops the sending process of the communication module 150, as the voltage value of the EDLC 130 has decreased to the first voltage value V1, which is the lower limit in the normal state. In the normal state, the communication module 150 sends operating state data of the outdoor unit 10 and the plurality of indoor units 20 to the cloud server 50 relatively frequently. Hence, the communication is stopped at the first voltage value V1 (2400) at which there is sufficient allowance until the lowest voltage value VL (1800), such that the EDLC 130 is recharged and prepared for the next sending process.

In the communication module 150 attempting to send data to the cloud server 50, there may be a case where the communication module 150 repeats the sending process a plurality of times due to, for example, communication congestion at the base station or poor reception. In order for the communication module 150 to be also able to send operating state data to the cloud server 50 reliably in such a case, a sufficient difference is provided between the maximum voltage value VMAX and the first voltage value V1. The time duration from the timings t2 through t3 is, for example, approximately from 7 seconds through 9 seconds.

The charges in the EDLC 130 that can be used from the timings t2 through t3 until the maximum voltage value VMAX decreases to the first voltage value V1 is Q1 (C) and corresponds to the area of the triangle illustrated by the dot hatching. At the timings from t2 through t3, the power in the EDLC 130 amounting to the charges Q1 (C) can be used.

In response to the microcomputer 180 stopping the sending process of the communication module 150 at the timing t3, the amount of power in the EDLC 130 to be used by the communication module 150 decreases, in response to which recharging the EDLC 130 starts and increases the voltage value. Here, the communication module 150 is kept in the on state. Hence, the voltage value of the EDLC 130 increases at approximately the same slope as that in the period from the timings t1 through t2.

In a case where the communication module 150 has completed the sending process to send operating state data to the cloud server 50 before the timing t3, the microcomputer 180 stops the sending process at the timing of the completion. After the sending process is stopped, the EDLC 130 is recharged.

In response to the voltage value of the EDLC 130 reaching the maximum voltage value VMAX at the timing t4, recharging is completed. Hence, "RECHARGING TIME" is indicated at the timings from t3 through t4. Any time during the voltage value of the EDLC 130 being the maximum voltage value VMAX, the microcomputer 180 controls the communication module 150 to send operating state data to the cloud server 50. Hence, here, for example, it is assumed that the microcomputer 180 controls the communication module 150 to send operating state data to the cloud server 50 at the timing t4 at which recharging is completed.

By the communication module 150 starting to send operating state data to the cloud server 50 at the timing t4, the voltage value of the EDLC 130 starts to decrease as of the timing t4. Here, for example, in order to describe the severest situation for the communication adapter 100, it is assumed that the communication module 150 performs the sending process to send operating state data to the cloud server 50 repeatedly. Hence, the voltage value of the EDLC 130 continues to decrease as of the timing t4.

The charges in the EDLC 130 that can be used from the timings t4 through t5 until the maximum voltage value VMAX decreases to the first voltage value V1 is Q2 (C) and corresponds to the area of the triangle illustrated by the dot hatching. At the timings from t4 through t5, the power in the EDLC 130 amounting to the charges Q2 (C) can be used. Here, for example, the charges Q2 (C) are the same as the charges Q1 (C) at the timings from t2 through t3.

In response to the voltage value of the EDLC 130 decreasing to the first voltage value V1 at the timing t5, the microcomputer 180 stops the sending process of the communication module 150. This is the same as at the timing t3. As of the timing t5, recharging the EDLC 130 starts and increases the voltage value.

In a case where the communication module 150 has completed the sending process to send operating state data to the cloud server 50 before the timing t5, the microcomputer 180 stops the sending process at the timing of the completion. After the sending process is stopped, the EDLC 130 is recharged.

At the timing t6, interruption of the power supply from the outdoor unit 10 occurs due to, for example, maintenance of the building 30 (see FIG. 1). Here, in order to describe the severest situation for the communication adapter 100, for example, it is assumed that the timing t6 is immediately after the timing t5, and the period of time for which the EDLC 130 has been recharged as of the timing t5 is extremely short.

In response to the power supply interruption occurring at the timing t6, the microcomputer 180 senses the occurrence of the power supply interruption based on the voltage monitor signal input from the power source voltage converting circuit 190.

In response to sensing the power supply interruption, the microcomputer 180 reduces the lower limit of the voltage value of the EDLC 130 to the second voltage value V2, switches the switch circuit 160, switches to the power saving mode, and controls the communication module 150 to send interruption occurrence data to the cloud server 50. In response to the power supply interruption, the microcomputer 180 controls the input terminal 162 and the output terminal 163 of the switch circuit 160 to be connected to each other to receive power supply from the EDLC 130 through the second power supply line. This is because the power supply to the terminal 101A from the outdoor unit 10 has been interrupted.

Also in the communication module 150 attempting to send interruption occurrence data to the cloud server 50, there may be a case where the communication module 150 repeats the sending process a plurality of times due to, for example, communication congestion at the base station or poor reception. Moreover, in starting this sending process, there may also be a case where the voltage value of the EDLC 130 is close to the first voltage value V1 and very low, like the voltage value at the timing t6.

Hence, in order to enable the communication module 150 to send the interruption occurrence data to the cloud server 50 reliably even in a severe situation like this, the lower limit of the voltage value of the EDLC 130 is reduced to the second voltage value V2, to sufficiently secure power that can be used for the sending process.

The communication adapter 100 secures a sufficient voltage difference (500) between the first voltage value V1 (2400) and the second voltage value V2 (1900) in order to enable interruption occurrence data to be sent to the cloud server 50 reliably even in a case of a power supply interruption occurring in a state of the voltage value of the EDLC 130 being the first voltage value V1. The values of the first voltage value V1 (2400) and the second voltage value V2 (1900) are examples, and not limited to these values.

When sending interruption occurrence data to the cloud server 50, the communication module 150 performs the process to send the interruption occurrence data repeatedly a predetermined number of times without confirming whether the interruption occurrence data has been received by the cloud server 50 or not. It is necessary to use the power in the EDLC 130 and perform communication for the confirmation of whether the data has been received or not, which is hence omitted in order to effectively allocate the remaining power in the EDLC 130 to sending the interruption occurrence data to the cloud server 50 in the power supply-interrupted state, and to deliver the interruption occurrence data to the cloud server 50 reliably.

The predetermined number of times is a number of times needed to deliver the interruption occurrence data to the cloud server 50 reliably even in face of communication congestion at the base station or poor reception. The voltage difference (500) between the first voltage value V1 (2400) and the second voltage value V2 (1900) is set to a voltage difference with which it is possible to obtain a power that enables the sending process to be performed repeatedly the predetermined number of times. Time is taken until the timing t7 to repeat the sending process starting at the timing t6 the predetermined number of times. Hence, "TIME ALLOWED FOR SENDING UPON INTERRUPTION" is indicated at the timings from t6 through t7.

The charges in the EDLC 130 that can be used from the timings t6 through t7 until the first voltage value V1 decreases to the second voltage value V2 is Q3 (C) and corresponds to the area of the trapezoid illustrated by the dot hatching. At the timings from t6 through t7, the power in the EDLC 130 amounting to the charges Q3 (C) can be used.

In response to the power supply interruption, the microcomputer 180 switches to the power saving mode, such that the communication module 150 sends the interruption occurrence data to the cloud server 50 reliably. Here, because no operating state data is sent, the power consumed by the microcomputer 180 and the communication module 150 is lower than in the normal state.

For the reason described above, the amount of power in the EDLC 130 that can be used by the microcomputer 180 and the communication module 150 in response to the power supply interruption is lower than the amount of power in the EDLC 130 that can be used by the communication module 150 in the normal state. However, a sufficient amount of power is secured for the microcomputer 180 and the communication module 150 that are in face of a power supply interruption. The amount of power in the EDLC 130 that can be used by the microcomputer 180 and the communication module 150 in a case of a power supply interruption is an amount of power corresponding to the voltage difference (500) between the first voltage value V1 (2400) and the second voltage value (1900). The amount of power in the EDLC 130 that can be used by the communication module 150 in the normal state is an amount of power corresponding to the voltage difference (700) between the lowest voltage value VMAX (3100) and the first voltage value V1 (2400).

In response to the voltage value of the EDLC 130 decreasing to the second voltage value V2 at the timing t7, the microcomputer 180 stops the sending process of the communication module 150, as the voltage value of the EDLC 130 has decreased to the second voltage value V2, which is the lower limit in a case of a power supply interruption. After stopping the sending process of the communication module 150, the microcomputer 180 switches to the deep sleep mode. In a case where there is a constraint such as a need to turn off the communication module 150 before the microcomputer 180 switches to the deep sleep mode, the microcomputer 180 needs only to turn off the communication module 150 before the voltage value of the EDLC 130 decreases to the lowest voltage value VL after the voltage value has decreased to the second voltage value V2. In this case, the microcomputer 180 needs only to switch to the deep sleep mode after turning off the communication module 150. In response to the voltage value of the EDLC 130 decreasing to the second voltage value V2 at the timing t7, the sending process of the communication module 150 is stopped. Hence, the slope (degree) of the decrease in the voltage value of the EDLC 130 until the voltage value of the EDLC 130 decreases to the lowest voltage value VL from the second voltage value V2 is gentler than the slope from the timings from t6 through t7. Hence, it is possible to secure a sufficient time for turning off the communication module 150. Turning off the communication module 150 means shutting down the communication module 150.

After sending the notification to the cloud server 50 in response to the power supply interruption, the communication module 150 ceases to perform the communication process, and the microcomputer 180 enters the deep sleep mode in which the microcomputer 180 does not start unless a start command is received from outside. In this state, the microcomputer 180 and the communication module 150 are in the state of consuming no power in the EDLC 130. Hence, even if the power in the EDLC 130 is consumed down to the second voltage value V2 lower than the first voltage value V1, which is the lower limit in the normal state, the subsequent operation of the communication adapter 100 is not affected.

In order to enable the power in the EDLC 130 to be used up until barely above the lowest voltage value VL in a case of a power supply interruption, the second voltage value V2 is set to a level obtained by adding a predetermined margin (allowance) to the lowest voltage value VL. The predetermined margin is, for example, 100 as a count value of the voltage value.

By enabling the power in the EDLC 130 to be consumed down to the second voltage value V2 lower than the first voltage value V1, which is the lower limit in the normal state, a sufficient amount of power that can be used by the microcomputer 180 and the communication module 150 is secured in the EDLC 130 in a case of a power supply interruption.

The time duration from the timings t6 through t7 is, for example, approximately from 6 seconds through 8 seconds. The microcomputer 180 and the communication module 150 can notify occurrence of a power supply interruption to the cloud server 50 repeatedly the predetermined number of times, by using the power amounting to the voltage difference between the first voltage value V1 and the second voltage value V2.

<Procedure of Microcomputer 180>

Figure 4:
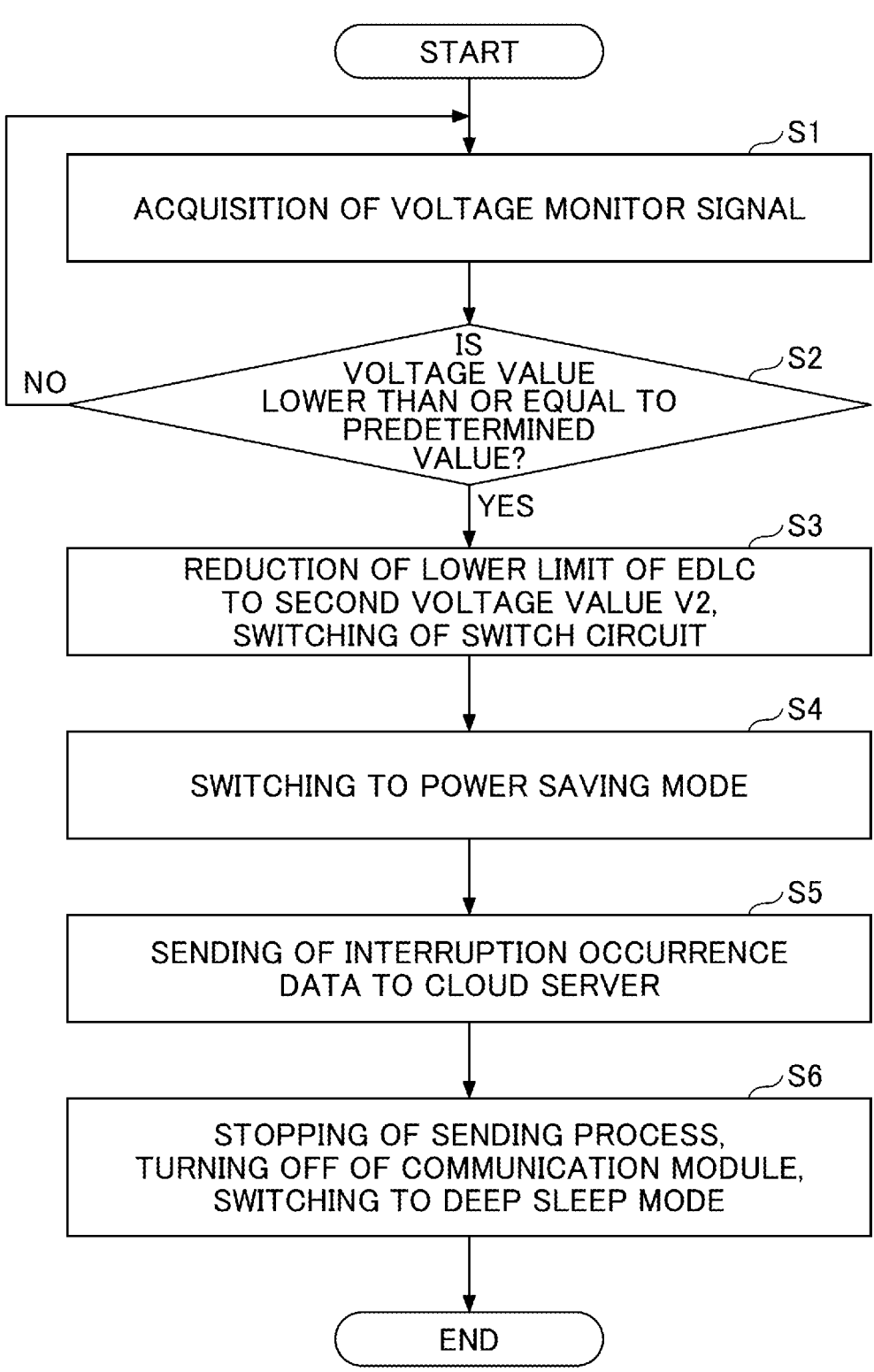
FIG. 4 is a diagram illustrating a flowchart indicating a procedure performed by a microcomputer 180.

FIG. 4 is a drawing illustrating a flowchart indicating the procedure performed by the microcomputer 180. The microcomputer 180 performs the following procedure.

Upon starting the procedure, the microcomputer 180 acquires the voltage monitor signal input from the power source voltage converting circuit 190 (step S1), in order to monitor the voltage value at the terminal 101A and determine whether a power supply interruption has occurred or not.

The microcomputer 180 determines whether the voltage value is lower than or equal to a predetermined value or not (step S2). The voltage monitor signal is at the H level when the voltage value of the direct-current power at the terminal 101A is higher than the predetermined value, and is at the L level when the voltage value is lower than or equal to the predetermined value. Hence, in the step S2, the microcomputer 180 needs only to determine whether the voltage monitor signal is at the L level or not.

When determining that the voltage value is not lower than or equal to the predetermined value (S2: NO), the microcomputer 180 returns the flow to the step S1, in order to perform the processes of the steps S1 and S2 again and monitor whether a power supply interruption has occurred or not. In a case where no power supply interruption has occurred, the microcomputer 180 performs the processes of the steps S1 and S2 repeatedly.

When determining that the voltage value is lower than or equal to the predetermined value in the step S2 (S2: YES), the microcomputer 180 reduces the lower limit of the voltage value of the EDLC 130 in the communicating state of the communication module 150 to the second voltage value V2, and controls the control terminal 182 to output to the effect that the input terminal 162 and the output terminal 163 of the switch circuit 160 are connected to each other (step S3). As a result, the lower limit of the voltage value of the EDLC 130 is reduced from the first voltage value V1 to the second voltage value V2, and the power supply line to the microcomputer 180 is switched from the first power supply line bypassing the EDLC 130 to the second power supply line via the EDLC 130. By the lower limit of the voltage value of the EDLC 130 in the communicating state of the communication module 150 being reduced to the second voltage value V2, the communication module 150 enters a state of remaining capable of performing communication until the voltage value of the EDLC 130 decreases to the second voltage value V2.

The microcomputer 180 switches to the power saving mode (step S4), in order to save on the power to be consumed by itself and enable the communication module 150 to send interruption occurrence data to the cloud server 50 reliably.

The microcomputer 180 controls the communication module 150 to send interruption occurrence data to the cloud server 50 (step S5). The microcomputer 180 controls the communication module 150 to perform sending the interruption occurrence data to the cloud server 50 repeatedly a predetermined number of times. The predetermined number of times is a number of times it is possible to repeat the sending with the amount of power corresponding to the voltage difference between the first voltage value V1 and the second voltage value V2. In the step S5, by the communication module 150 sending the interruption occurrence data to the cloud server 50 repeatedly the predetermined number of times, the voltage value of the EDLC 130 decreases by the voltage difference between the first voltage value V1 and the second voltage value V2.

In the step S5, the communication module 150 performs the process to send the interruption occurrence data repeatedly the predetermined number of times without confirming whether the interruption occurrence data has been received by the cloud server 50 or not. It is necessary to use the power in the EDLC 130 and perform communication in order to perform the confirmation of whether the data has been received or not, which is hence omitted in order to effectively allocate the remaining power in the EDLC 130 to sending the interruption occurrence data to the cloud server 50 in the power supply-interrupted state, and to deliver the interruption occurrence data to the cloud server 50 reliably. When sending over the predetermined number of times has been completed, the microcomputer 180 moves the flow forward to the step S6.

The microcomputer 180 stops the sending process of the communication module 150 and turns off the communication module 150, and switches to the deep sleep mode (step S6), in order to be on standby in the deep sleep mode, because sending the interruption occurrence data to the cloud server 50 has been completed. Upon this, the series of processes has ended (end).

As describe above, in response to occurrence of interruption of the power supply from the outdoor unit 10, the microcomputer 180 reduces the lower limit of the voltage value of the EDLC 130 in the communicating state of the communication module 150 from the first voltage value V1 to the second voltage value V2.

Hence, it is possible to provide a communication adapter 100 that can notify interruption occurrence data indicating occurrence of a power supply interruption to the cloud server 50 in response to the power supply interruption. By receiving the interruption occurrence data, the cloud server 50 can recognize a power supply interruption instead of a communication trouble, and can efficiently prepare for, for example, the recovery process.

The microcomputer 180 switches to the power saving mode when the power supply from the outdoor unit 10 is interrupted. Hence, in response to the power supply interruption, the microcomputer 180 can save on power consumption, such that the communication module 150 can perform the sending process repeatedly with the power in the EDLC 130.

The microcomputer 180 switches to the power saving mode by notifying occurrence of interruption of the power supply from the outdoor unit 10 to the cloud server 50 via the communication module 150. Hence, it is possible to satisfy both of notification of the interruption occurrence data to the cloud server 50 and saving of the power consumed by the microcomputer 180.

The microcomputer 180 senses a power supply interruption in response to the voltage of the power supplied to the EDLC 130 from the outdoor unit 10 becoming lower than or equal to a predetermined value. Hence, occurrence of a power supply interruption can be easily sensed based on a decrease in the voltage of the supplied power.

After a power supply interruption is sensed, the microcomputer 180 remains capable of notifying occurrence of the power supply interruption to the cloud server 50 via the communication module 150 until the voltage value of the EDLC 130 decreases to the second voltage value V2. Hence, when a power supply interruption occurs, it continues to be possible to notify the power supply interruption until decrease to the second voltage value V2 lower than the first voltage value V1, which is the lower limit while the EDLC 130 is receiving power supply from the outdoor unit 10. Hence, it is possible to notify occurrence of a power supply interruption to the cloud server 50 more reliably.

The microcomputer 180 stops the communication of the communication module 150 in response to the voltage value of the EDLC 130 decreasing below the second voltage value V2 after a power supply interruption is sensed. Hence, notifying is possible until the voltage value of the EDLC 130 decreases to the second voltage value V2, and it is possible to notify occurrence of a power supply interruption to the cloud server 50 more reliably and to also stop the communication of the communication module 150 in response to decrease below the second voltage value V2.

The difference between the first voltage value V1 and the second voltage value V2 is a voltage value for the microcomputer 180 to be capable of notifying occurrence of a power supply interruption to the cloud server 50 repeatedly a predetermined number of times. Hence, the microcomputer 180 can notify occurrence of a power supply interruption to the cloud server 50 repeatedly a predetermined number of times after the voltage value of the EDLC 130 has decreased below the first voltage value V1, and it is possible to notify occurrence of a power supply interruption to the cloud server 50 more reliably in a case of a power supply interruption.

The difference between the maximum voltage value VMAX and the first voltage value V1 of the EDLC 130 is greater than the difference between the first voltage value V1 and the second voltage value V2. In the normal state, the communication module 150 sends operating state data of the outdoor unit 10 and the plurality of indoor units 20 to the cloud server 50 regularly or irregularly, and needs more power than in case of a power supply interruption. A sufficient voltage value that can be used to communicate with the cloud server 50 in the normal state can be secured in the EDLC 130.

Moreover, because the first voltage value V1 and the second voltage value V2 are voltage values of the EDLC 130, lower limit management is easy based on the voltage value of the EDLC 130. Instead of the first voltage value V1 and the second voltage value V2, the capacity of the EDLC 130 or the amount of charges in the EDLC 130 may be used.

Because the outdoor unit 10 is an outdoor unit 10 of an air conditioner, is it possible to notify occurrence of a power supply interruption to the cloud server 50 in response to interruption of power supply from the outdoor unit 10 of the air conditioner. An embodiment in which the external device is the outdoor unit 10 of an air conditioner has been described above. The external device may be a device other than the outdoor unit 10 of an air conditioner. It is possible to provide a communication adapter 100 that can notify occurrence of a power supply interruption to the cloud server 50 in response to interruption of power supply from the external device other than the outdoor unit 10 of an air conditioner.

As described above, the first power supply line through which power is supplied from the outdoor unit 10 to the microcomputer 180 by bypassing the EDLC 130 and the second power supply line through which power is supplied to the microcomputer 180 from the EDLC 130 are provided. Hence, the microcomputer 180 can be supplied with power through the second power supply line in response to interruption of the power supply from the outdoor unit 10.

Hence, it is possible to provide a communication adapter 100 that can perform communication even without power supply from the outdoor unit 10.

The switch circuit 160 configured to switch between the first power supply line and the second power supply line is provided. Hence, it is possible to switch between the first power supply line and the second power supply line reliably in response to interruption of power supply from the outdoor unit 10.

The microcomputer 180 switches between the first power supply line and the second power supply line by driving the switch circuit 160 based on the voltage of the power supplied from the outdoor unit 10. Hence, it is possible to switch between the first power supply line and the second power supply line reliably in accordance with the voltage of the power supplied from the outdoor unit 10.

In response to the voltage of the power supplied from the outdoor unit 10 becoming lower than or equal to a predetermined value, the microcomputer 180 switches from the first power supply line to the second power supply line. Hence, in response to the voltage of the power supplied from the outdoor unit 10 becoming lower than or equal to the predetermined value, the microcomputer 180 can be supplied with power from the EDLC 130 through the second power supply line.

The microcomputer 180 switches to the power saving mode in response to the voltage of the power supplied from the outdoor unit 10 becoming lower than or equal to the predetermined value. Hence, in response to the voltage of the power supplied from the outdoor unit 10 becoming lower than or equal to the predetermined value, it is possible to save on power consumption by the microcomputer 180.

The microcomputer 180 receives power supply through the first power supply line while power supply from the outdoor unit 10 is received, and receives power supply through the second power supply line while power supply from the outdoor unit 10 is interrupted. Hence, the microcomputer 180 can be supplied with power from the EDLC 130 through the second power supply line while power supply from the outdoor unit 10 is interrupted.

A DC/DC converter 140 configured to output the output voltage of the EDLC 130 to the communication module 150 by boosting the output voltage is provided. Hence, the communication module 150 can perform communication even when the output voltage of the EDLC 130 is low.

The current limiting circuit 120 is provided at the upstream side of the EDLC 130, and the first power supply line supplies power to the microcomputer 180 from the upstream side of the current limiting circuit 120. Hence, it is possible to supply sufficient power to the microcomputer 180 through the first power supply line by avoiding being limited by the current limiting circuit 120.

The outdoor unit 10 is an outdoor unit 10 of an air conditioner. Hence, it is possible to provide a communication adapter 100 that can perform communication even without power supply from an outdoor unit 10 of an air conditioner. An embodiment in which the external device is the outdoor unit 10 of an air conditioner has been described above. The external device may be a device other than the outdoor unit 10 of an air conditioner. It is possible to provide a communication adapter 100 that can perform communication even without power supply from the external device other than the outdoor unit 10 of an air conditioner.

A communication adaptor according to an illustrative embodiment has been described above. However, the present invention is not limited to the specifically disclosed embodiment, and various modifications and changes are applicable within the scope of the claims.

This international application claims priority to Japanese Patent Application No. 2021-114547 filed Jul. 9, 2021, the entire contents of which are incorporated herein by reference.

REFERENCE SIGNS LIST

100 communication adapter
110 DC/DC converter
120 current limiting circuit
130 EDLC
140 DC/DC converter
150 communication module
160 switch circuit
170 LDO
180 microcomputer
190 power source voltage converting circuit

The invention claimed is:

1. A communication adapter, comprising:
   a power storage configured to receive power supplied from an external device and store the power;
   a communication unit configured to receive power supplied from the power storage;

a control unit configured to communicate with an external management device via the communication unit;
   a first power supply line through which the power supplied from the external device is supplied to the control unit, while bypassing the power storage; and
   a second power supply line through which the power supplied from the power storage is supplied to the control unit,
   wherein the control unit is configured to:
      switch a normal mode to a power-saving mode that reduces power consumption compared to the normal mode, upon occurrence of a condition in which a voltage of the power supplied from the external device is less than or equal to a predetermined value, and
      supply the power from the power storage to the communication unit in the power-saving mode, and
   wherein the control unit includes a processor and entering the power-saving mode includes reducing a clock frequency of the processor and stopping a portion of components that is not involved in communication by the communication unit.

2. The communication adapter according to claim 1, further comprising:
   a switch circuit configured to switch between the first power supply line and the second power supply line.

3. The communication adapter according to claim 2, wherein the control unit is configured to switch between the first power supply line and the second power supply line by driving the switch circuit based on the voltage of the power supplied from the external device.

4. The communication adapter according to claim 1, wherein the control unit is configured to switch from the first power supply line to the second power supply line upon occurrence of the condition in which the voltage of the power supplied from the external device is less than or equal to the predetermined value.

5. The communication adapter according to claim 1, wherein the control unit is configured to receive the power through the first power supply line while the power is being supplied from the external device, and receive the power supplied through the second power supply line while supply of the power from the external device is interrupted.

6. The communication adapter according to claim 1, further comprising:
   a booster configured to output an output voltage of the power storage to the communication unit by boosting the output voltage.

7. The communication adapter according to claim 1, further comprising:
   a current limiter situated at an upstream side of the power storage,
   wherein the power supplied to the control unit through the first power supply line is from an upstream side of the current limiter.

8. The communication adapter according to claim 1, wherein the external device is an outdoor unit of an air conditioner.

\* \* \* \* \*